(12) United States Patent
Harimoto

(10) Patent No.: US 6,684,083 B1
(45) Date of Patent: Jan. 27, 2004

(54) PORTABLE INFORMATION TERMINAL WITH STANDBY POWER SUPPLY

(75) Inventor: Masayuki Harimoto, Tokyo (JP)

(73) Assignee: NEC Corporation, Tokyo (JP)

( * ) Notice: Subject to any disclaimer, the term of this patent is extended or adjusted under 35 U.S.C. 154(b) by 569 days.

(21) Appl. No.: 09/692,541

(22) Filed: Oct. 20, 2000

(30) Foreign Application Priority Data

Oct. 21, 1999 (JP) .............................................. 9-299378

(51) Int. Cl.[7] ................................................ H04B 1/38
(52) U.S. Cl. .................. 455/556.1; 455/574; 455/343.2
(58) Field of Search .......................... 455/556.1, 556.2, 455/343.1, 343.2, 572, 574, 550, 90, 555, 573, 575, 127, 552, 553

(56) References Cited

U.S. PATENT DOCUMENTS

| | | | | |
|---|---|---|---|---|
| 6,445,937 B1 | * | 9/2002 | daSilva | 455/574 |
| 6,463,305 B1 | * | 10/2002 | Crane | 455/566 |
| 6,501,961 B1 | * | 12/2002 | Kirkpatrick | 455/553.1 |
| 6,501,969 B1 | * | 12/2002 | Cannon et al. | 455/574 |
| 6,526,294 B1 | * | 2/2003 | Banh et al. | 455/573 |
| 6,526,295 B1 | * | 2/2003 | Shull | 455/574 |
| 6,535,752 B1 | * | 3/2003 | Dent | 455/574 |
| 6,549,144 B1 | * | 4/2003 | Goeken | 340/825.69 |
| 6,564,074 B2 | * | 5/2003 | Romans | 455/574 |

FOREIGN PATENT DOCUMENTS

| | | |
|---|---|---|
| JP | 11-65725 | 3/1999 |
| JP | 11-88255 | 3/1999 |
| JP | 11-98576 | 4/1999 |

* cited by examiner

*Primary Examiner*—Pablo N Tran
(74) *Attorney, Agent, or Firm*—Whitman, Curtis & Christofferson, PC

(57) ABSTRACT

A portable information terminal has a detector for detecting a radio wave sent from a mobile telephone set and generating a power supply voltage from electric energy extracted from the radio wave. If there is no process to be carried out by the portable information terminal, then the portable information terminal is brought into a standby mode, and the supply of a main power supply voltage from a main power supply to various parts of the portable information terminal is stopped. A connector operates under the power supply voltage generated by the detector, and instructs the main power supply to supply the main power supply voltage to the various parts of the portable information terminal when it receives an indication to start data communications from the mobile telephone set.

3 Claims, 3 Drawing Sheets

PORTABLE INFORMATION TERMINAL WITH STANDBY POWER SUPPLY

BACKGROUND OF THE INVENTION

1. Field of the Invention

The present invention relates to a portable information terminal.

2. Description of the Related Art

With the advent in recent years of small, lightweight information-handling devices, it has been increasingly popular to use portable information terminals which may be connected to a mobile telephone set, for example, by a cable for outdoor data communications by sending and receiving e-mail and browsing home pages on the Internet. Such portable information terminals include laptop personal computers and personal digital assistants that are finding growing usage because of easy-to-use operating systems incorporated therein. The portable information terminals may also be used for on-line shopping, global positioning, and route guidance as well as browsing home pages and sending and receiving e-mail.

Portable information terminals are convenient for use in outdoor applications where access to wired communications is limited, and can be used for data communications anytime and anywhere, even while in motion.

Since portable information terminals are primarily used for data communications, they have an input unit for inputting information to be sent and a display unit for displaying received information. Generally, portable information terminals are larger in size than mobile telephone sets that mainly serve the purpose of speech communications, and are battery-operated for a period of time which is shorter than the standby time of the mobile telephone sets. Because the portability of portable information terminals is an essential feature to be maintained, it is not desirable for portable information terminals to be accompanied by large batteries. Therefore, there is a limitation on efforts to increase the battery-operated time of a portable information terminal by increasing the capacity of the battery thereof. Accordingly, it is important to make portable information terminals usable on batteries for as long a period of time as possible by reducing the power consumption by the portable information terminals. One approach to the reduced power consumption is to turn off the portable information terminal to save electric energy while the portable information terminal does not need to operate.

For data communications, the user of a portable information terminal often places the portable information terminal in a standby mode waiting for incoming data so that it can receive e-mail anytime. The portable information terminal needs to be in the standby mode so as to be ready for operation anytime in case of the arrival of incoming data while at the same time saving electric energy.

FIG. 1 of the accompanying drawings is a block diagram of an arrangement of a conventional portable information terminal.

As shown in FIG. 1, portable information terminal 3 is connected to potable telephone set 2 by connector 31, and exchanges data to be sent and received data and control information with potable telephone set. While in a standby mode, portable information terminal 3 turns off controller 33 and information processor 34 in order to minimize power consumption by portable information terminal 3. However, connector 31 is kept in operation at all times because it is necessary for portable information terminal 3 to receive an indication of data reception from mobile telephone set 2. Therefore, portable information terminal 3 continuously consumes electric energy sufficient to operate connector 31 even in the standby mode.

The conventional portable information terminal that consumes electric energy in the standby mode is not preferable in view of the requirement for a long period of time in which it can be used on the battery.

SUMMARY OF THE INVENTION

It is therefore an object of the present invention to provide a portable information terminal which does not consume electric energy while in a standby mode.

To achieve the above object, a portable information terminal according to the present invention has a detector for detecting a radio wave sent from a mobile telephone set and generating a power supply voltage from electric energy extracted from the radio wave.

If there is no process to be carried out by the portable information terminal, then the portable information terminal is brought into a standby mode, and the supply of a main power supply voltage from a main power supply to various parts of the portable information terminal is stopped. A connector operates under the power supply voltage generated by the detector, and instructs the main power supply to supply the main power supply voltage to the various parts of the portable information terminal when it receives an indication to start data communications from the mobile telephone set.

In the standby mode, the portable information terminal operates under only the power supply voltage generated from the electric energy that is extracted from the radio wave sent from the mobile telephone set. Therefore, the portable information terminal does not consume the electric energy of the main power supply, which typically comprises a battery.

The portable information terminal may be placed into the standby mode upon detection of the elapse of a preset period of time in which no process has been performed by portable information terminal.

After the portable information terminal is brought from the standby mode into the normal mode to start the data communications, the portable information terminal may be immediately brought back into the standby mode in response to completion of the data communications.

The above and other objects, features, and advantages of the present invention will become apparent from the following description with reference to the accompanying drawings which illustrate an example of the present invention.

DESCRIPTION OF THE PREFERRED EMBODIMENT

Figure 1:
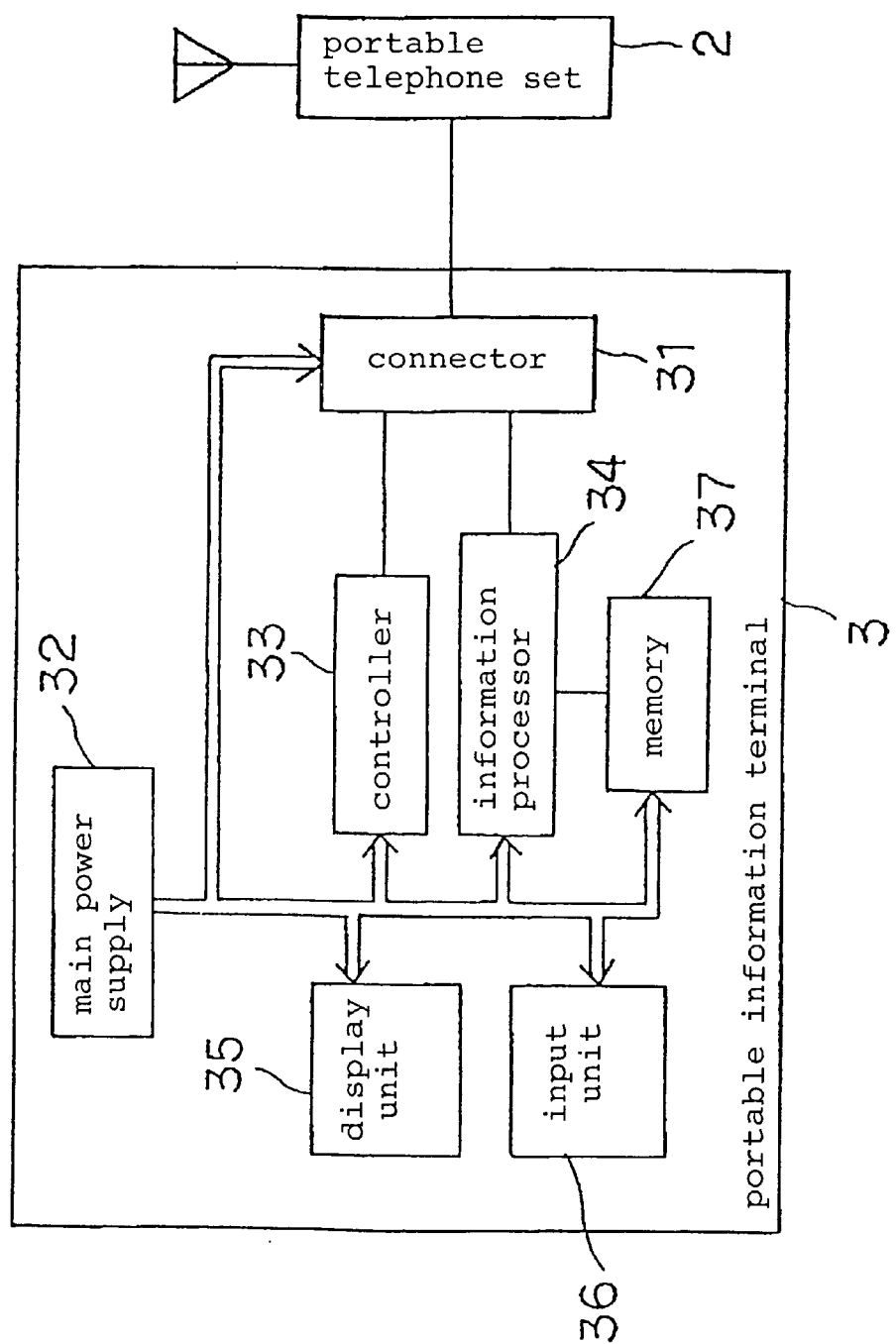
FIG. 1 is a block diagram of a conventional portable information terminal.
Figure 2:
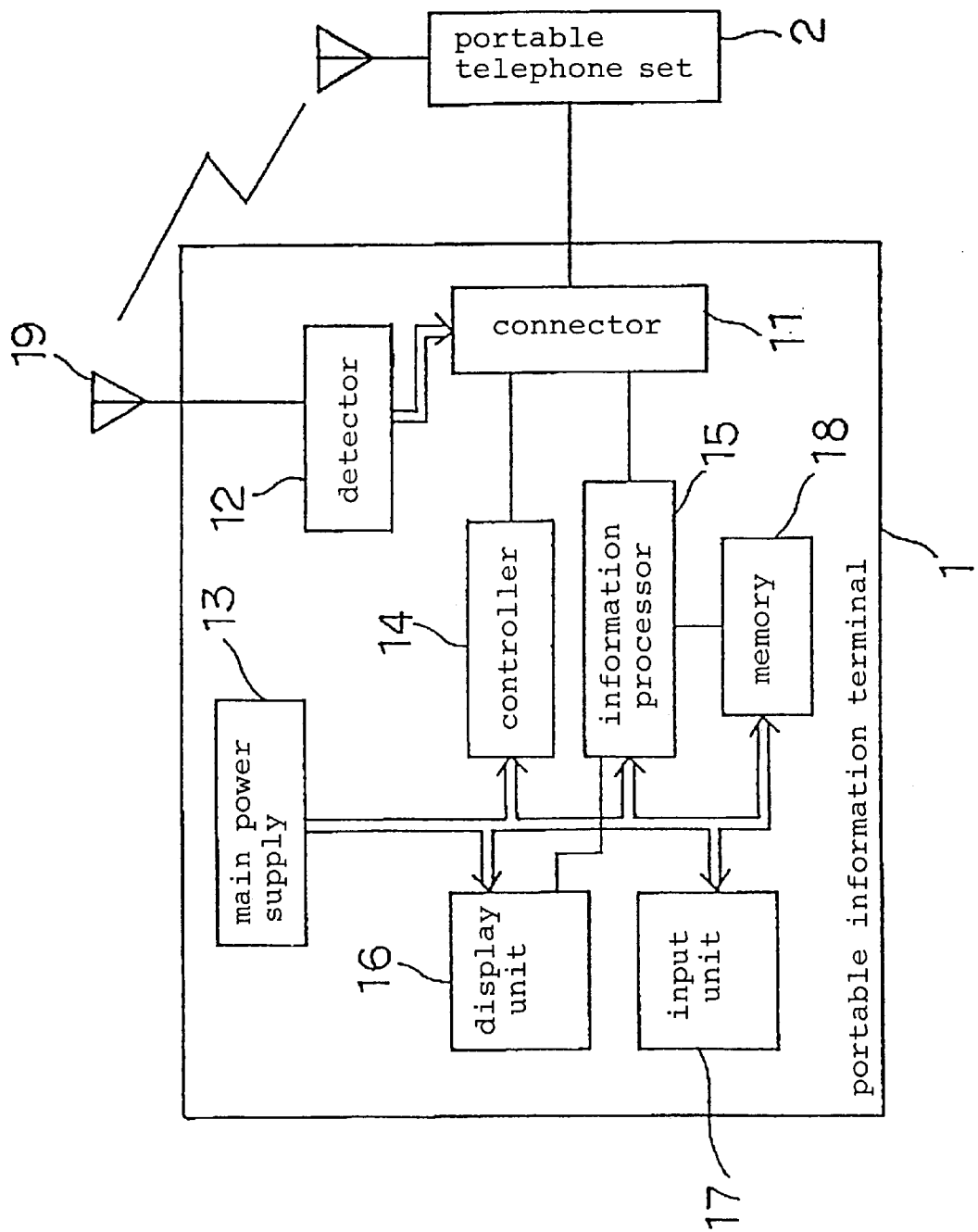
FIG. 2 is a block diagram of a portable information terminal according to the present invention.

Referring to FIG. 2, portable information terminal 1 has connector 11, detector 12, main power supply 13, controller 14, information processor 15, display unit 16, input unit 17, memory 18, and antenna 19.

The detector 12 detects a radio wave transmitted from mobile telephone set 2 and received by antenna 19, extracts electric energy from the detected ratio wave, and generates a power supply voltage. In a normal mode, connector 11 operates under a main power supply voltage supplied from main power supply 13, which typically comprises a battery. When portable information terminal 1 is in a standby mode, connector 11 operates under the power supply voltage supplied from detector 12. When connector 11 receives an indication of the start of data communication from mobile telephone set 2, connector 11 instructs main power supply 13 to start supplying the main power supply voltage. Main power supply 13 now starts supplying the main power supply voltage to various parts of portable information terminal 1. When portable information terminal 1 is in a standby mode, main power supply 13 stops supplying the main power supply voltage.

Information processor 15 processes data to be sent and received data. Input unit 17 is operated by the user to input data and also commands for starting/stopping data communications. Memory 18 serves to store data. Display unit 16 displays received data and also data inputted from input unit 17 by the user. Controller 14 exchanges control data for sending and receiving data with mobile telephone set 2 via connector 11, and controls parts of portable information terminal 1 based on the exchanged data. If a preset period of time elapses in which no process has been performed by portable information terminal 1, then controller 14 switches portable information terminal 1 into a standby mode.

Figure 3:
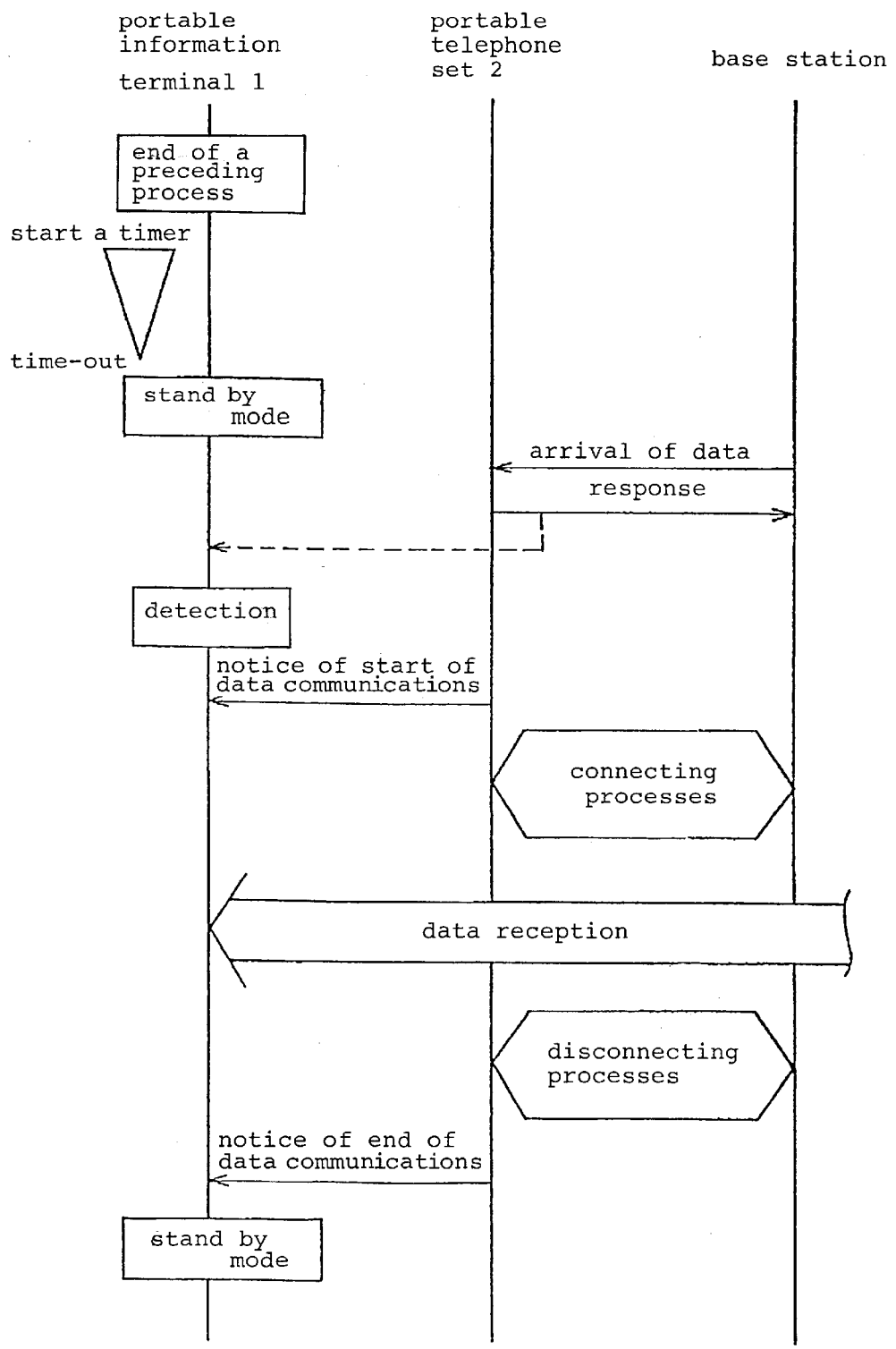
FIG. 3 is a sequence diagram illustrative of an operation sequence of the portable information terminal shown in FIG. 2.

Operation of portable information terminal 1 will be described below with reference to FIG. 3.

After portable information terminal 1 has finished a preceding process in step 21, if controller 14 detects the elapse of a preset period of time in which no process has been performed by portable information terminal 1, then controller 14 switches portable information terminal 1 into a standby mode in step 22. In the standby mode, controller 14, information processor 15, etc. are turned off, and are not supplied with the main power supply voltage from the main power supply 13. However, only connector 11 is ready for operation when supplied with the power supply voltage from detector 12 so that connector 11 can operate even in the standby mode. In the standby mode, therefore, the electric energy of the main power supply 13 is not consumed.

When incoming data from a base station (not shown) arrives at mobile telephone set 2, mobile telephone set 2 responds to the data, and sends an indication to start data communication to portable information terminal 1.

In portable information terminal 1, detector 12 detects a radio wave sent from mobile telephone set 2 to the base station, extracts electric energy from the detected radio wave, generates a power supply voltage from the extracted electric energy, and supplies the generated power supply voltage to connector 11 in step 23. Connector 11 is now activated to recognize the indication from mobile telephone set 2. Thereafter, when connector 11 receives the indication to start data communication, connector 11 instruct main power supply 13 to supply the main power supply voltage to controller 14, information processor 15, etc. Portable information terminal 1 is now activated as a whole, and operates in a normal mode.

A handshaking process is carried out between the base station and mobile telephone set 2 for processing a call, making settings for data communications, etc. When a communication path to a companion terminal (not shown) is established, portable information terminal 1 starts receiving data via the established communication path. The received data is stored in memory 18.

Upon completion of the data communications, a disconnecting process is carried out between the base station and mobile telephone set 2 for processing a call, etc. The end of the data communications is indicated from mobile telephone set 2 via connector 11 to controller 14 of portable information terminal 1.

After any process to be performed by information processor 15 has been finished, controller 14 responds to the indication of the end of the data communications to stop the supply of the main power supply voltage from the main power supply 13 for thereby turning off parts of portable information terminal 1. Portable information terminal 1 is now brought into the standby mode again in step 24.

In the standby mode, since portable information terminal 1 operates under only the power supply voltage generated from the radio wave sent from mobile telephone set 2, portable information terminal 1 does not consume the electric energy of main power supply 13. Accordingly, the power consumption by portable information terminal 1 is minimized, allowing portable information terminal 1 to be used for a prolonged period of time.

Detector 12 is advantageous in that it dispenses with the need for another power supply, and hence may be used not only for the standby mode but also for other applications.

While a preferred embodiment of the present invention has been described using specific terms, such description is for illustrative purposes only, and it is to be understood that changes and variations may be made without departing from the spirit or scope of the following claims.

What is claimed is:

1. A portable information terminal for connecting to a mobile telephone set for data communications, comprising:

detecting means for detecting a radio wave sent from the mobile telephone set, extracting electric energy from the detected radio wave, and generating a power supply voltage from the extracted electric energy;

information processing means for processing data to be sent and received data;

memory means for storing data;

input means operable by the user for inputting data and commands;

display means for displaying data;

a main power supply for stopping supplying a main power supply voltage in a standby mode in which no process is to be performed by the portable information terminal, and starting to supply the main power supply, voltage to said information processing means, said memory means, said input means, and said display means in response to an instruction to start supplying the main power supply voltage; and a connector selectively operable in a normal mode under the main power supply voltage supplied from said main power supply and operable in said standby mode under the power supply voltage supplied from said detecting means, said connector being responsive to an indication to start data communications from said mobile telephone set, for instructing said main power supply to start supplying said main power supply voltage.

2. A portable information terminal according to claim 1, further comprising:

control means for placing the portable information terminal in said standby mode upon detection of the elapse of a preset period of time in which no process has been performed by portable information terminal.

3. A portable information terminal according to claim 1, further comprising:

control means for bringing the portable information terminal from said standby mode into said normal mode to start the data communications, and immediately bringing the portable information terminal back into said standby mode in response to completion of the data communications.

\* \* \* \* \*